United States Patent
Patterson (12) 
(10) Patent No.: US 12,194,587 B2
(45) Date of Patent: Jan. 14, 2025

(54) PNEUMATIC TOOL WITH GEAR TRAIN

(71) Applicant: Snap-on Incorporated, Kenosha, WI (US)

(72) Inventor: Matthew D. Patterson, Knoxville, TN (US)

(73) Assignee: Snap-on Incorporated, Kenosha, WI (US)

( * ) Notice: Subject to any disclaimer, the term of this patent is extended or adjusted under 35 U.S.C. 154(b) by 744 days.

(21) Appl. No.: 17/094,012

(22) Filed: Nov. 10, 2020

(65) Prior Publication Data

US 2022/0143775 A1 May 12, 2022

(51) Int. Cl.
| | | |
|---|---|---|
| F16H 3/46 | (2006.01) | |
| B24B 23/02 | (2006.01) | |
| B25F 5/00 | (2006.01) | |
| B25F 5/02 | (2006.01) | |

(52) U.S. Cl.
CPC ............ *B24B 23/026* (2013.01); *B25F 5/001* (2013.01); *B25F 5/02* (2013.01); *F16H 3/46* (2013.01); *B25F 5/005* (2013.01); *F16H 2200/2007* (2013.01)

(58) Field of Classification Search
CPC ....... B24B 23/026; B24B 23/02; B24B 41/04; B24B 47/12; B24B 47/14; B24B 47/26; B25F 5/001; B25F 5/02; B25F 5/005; F16H 3/46; F16H 2200/2007
See application file for complete search history.

(56) References Cited

U.S. PATENT DOCUMENTS

| | | | |
|---|---|---|---|
| 3,298,481 A | | 1/1967 | Schaedler et al. |
| 3,442,362 A | | 5/1969 | Bangerter |
| 3,739,659 A | | 6/1973 | Workman, Jr. |
| 4,153,990 A | | 5/1979 | Kamimura |
| 5,011,341 A | * | 4/1991 | DeGroff ............... B23B 45/008 408/124 |
| 6,733,414 B2 | | 5/2004 | Elger |
| 7,112,157 B2 | * | 9/2006 | Uebbing ............. F16H 37/0833 475/329 |
| 7,364,526 B2 | | 4/2008 | Cho |

(Continued)

FOREIGN PATENT DOCUMENTS

| | | |
|---|---|---|
| CN | 101065217 A | 10/2007 |
| CN | 101172338 A | 5/2008 |

(Continued)

OTHER PUBLICATIONS

RCTalk article, pp. 1-3, published Jan. 1, 2004. (Year: 2023).*

(Continued)

*Primary Examiner* — Tisha D Lewis (74) *Attorney, Agent, or Firm* — Taft Stettinius & Hollister LLP (57) ABSTRACT

The present invention relates broadly to pneumatic tools, such as a sander, that provide an optimum output speed and has significant stall torque to reduce the risk of the tool from stalling during use. The tool includes a coupled gear set that drives an output accessory, such as an abrasive pad, at an optimum speed without loss of power or power reduction, and with an amplified stall torque. The coupled gear set may include a first gear set that functions as a speed reducer, and a second gear set that functions as a speed increaser.

21 Claims, 8 Drawing Sheets

(56) References Cited

U.S. PATENT DOCUMENTS

| | | | |
|---|---|---|---|
| 7,494,437 B2 | 2/2009 | Chen | |
| 7,794,355 B2 * | 9/2010 | Pusateri | B25F 5/001 |
| | | | 475/331 |
| 8,727,034 B2 | 5/2014 | Brogli et al. | |
| 8,851,201 B2 | 10/2014 | Limberg et al. | |
| 9,108,312 B2 | 8/2015 | Elger et al. | |
| 10,180,178 B2 | 12/2019 | Boiger et al. | |
| 10,513,023 B2 | 12/2019 | Mao | |
| 10,525,580 B2 | 1/2020 | Mao | |
| 10,670,115 B2 | 6/2020 | Chae et al. | |
| 11,648,657 B2 * | 5/2023 | Barth | B25F 5/02 |
| | | | 451/359 |
| 2007/0281822 A1 | 12/2007 | Baumann et al. | |
| 2009/0003949 A1 | 1/2009 | Mok et al. | |
| 2012/0222879 A1 | 9/2012 | Bixler et al. | |
| 2015/0367493 A1 * | 12/2015 | Pedersen | B25F 5/001 |
| | | | 475/331 |
| 2019/0301571 A1 | 10/2019 | Tesar | |
| 2019/0383384 A1 | 12/2019 | Boiger et al. | |
| 2021/0170564 A1 * | 6/2021 | Gehret | B23B 45/00 |

FOREIGN PATENT DOCUMENTS

| | | |
|---|---|---|
| CN | 108278337 | 7/2018 |
| CN | 108290265 A | 7/2018 |
| CN | 108687708 A | 10/2018 |
| CN | 210115785 U | 2/2020 |
| CN | 109681591 | 7/2020 |
| DE | 202007000646 | 7/2007 |
| DE | 202014104217 | 10/2014 |
| EP | 1970165 A1 | 9/2008 |
| EP | 1970166 B1 | 9/2008 |
| GB | 2117485 | 6/1985 |
| GB | 2437656 A * | 10/2007 ........... B25B 13/488 |
| JP | H09323267 A | 12/1997 |
| KR | 20070096985 | 10/2007 |
| KR | 20070096985 A | 10/2007 |
| KR | 20150028026 | 3/2015 |
| TW | 200827105 A | 7/2008 |
| TW | M588042 | 12/2019 |
| WO | 2003042576 | 5/2003 |
| WO | 2005032770 A | 4/2005 |
| WO | 201210093 | 1/2012 |
| WO | 2017173884 | 10/2017 |
| WO | 2019042907 | 3/2019 |
| WO | 2019042908 | 3/2019 |

OTHER PUBLICATIONS

Australian Examination Report No. 1 for corresponding AU Application No. 2021254573, dated Dec. 9, 2022, 6 pages.

Canadian Office Action for corresponding CA Application No. 3,138,106, dated Jan. 6, 2023, 3 pages.

Chinese Office Action for corresponding Application No. 11120122100 dated Feb. 11, 2022, 13 pages.

Combined Search and Examination Report for corresponding Application No. GB2115128.7 dated Apr. 22, 2022, 5 pages.

Taiwan Office Action for corresponding Application No. 11220164430 dated Feb. 21, 2023, 9 pages.

Taiwan Office Action for corresponding Application No. 11120746860 dated Aug. 1, 2022, 6 pages.

Taiwan Office Action for corresponding Application No. 2021113207151 dated Apr. 6, 2023, 12 pages.

* cited by examiner

FIG. 8 ness of the motor. In another example, a pneumatic sander may include a restricted motor that limits the output speed by restricting the motor. However, in this example, power and stall torque is also reduced, and the sander may stall easily. In yet another example, a sander may include a geared motor that reduces the output speed. However, in this example, output speed tends to be reduced more than desired and the sander does not perform optimally.

PNEUMATIC TOOL WITH GEAR TRAIN

TECHNICAL FIELD OF THE INVENTION

The present invention relates generally to pneumatic tools, and more particularly, to a pneumatic tool with an improved gear train.

BACKGROUND OF THE INVENTION

Many tools are powered by pneumatic air or hydraulic fluid. In traditional pneumatic tools, such as pneumatic sanders, air or hydraulic fluid is directed to a motor to provide power to the tool. Pneumatic sanders typically operate at high rotational speeds, but have difficulty handling increased frictional force or torque. For example, when sanding a rough surface, the sander may stall due to an amount of friction or torque between the sand paper and the surface exceeding a stall torque capacity of the sander. Further, for many applications and uses, a sander is needed that provides an output speed that is less than the normal operating speed of the motor, and/or an output speed that is higher than a maximum operating speed of the motor.

In an example, a pneumatic sander may include a governed motor to provide output speed, but such a sander tends to stall easily due to overloading of the motor. In another example, a pneumatic sander may include a restricted motor that limits the output speed by restricting the motor. However, in this example, power and stall torque is also reduced, and the sander may stall easily. In yet another example, a sander may include a geared motor that reduces the output speed. However, in this example, output speed tends to be reduced more than desired and the sander does not perform optimally.

SUMMARY OF THE INVENTION

The present invention relates broadly to pneumatic tools, such as a sander, that provides an optimum output speed (such as about 12000 to 14000 RPMs) and has significant stall torque to reduce the risk of the tool from stalling during use. The tool includes a coupled gear set that drives an output accessory, such as an abrasive pad, at an optimum speed without loss of power or power reduction, and with an amplified stall torque. The coupled gear set may include first and second gear sets. The first gear set may be used to reduce output speed, and also to drive the second gear set. The second gear set may be used to increase output speed. Thus, the first gear set functions as a speed reducer, and the second gear set functions as a speed increaser.

In an embodiment, the present invention relates to a pneumatic tool with an output shaft and a motor having a motor shaft, wherein the motor shaft rotates at a first rotational speed. The tool also includes a gear carrier having first and second sides. A first gear set is operably coupled to the first side, and adapted to receive rotational force from the motor shaft and provide rotational force at a second rotational speed less than the first rotational speed. A second gear set is operably coupled to the second side and adapted to receive the rotational force from the first gear set and provide output rotational force to the output shaft at a third rotational speed that is greater than the second rotational speed.

In another embodiment, the present invention relates to a gear assembly for a pneumatic tool with a motor having a motor shaft adapted to rotate at a first rotational speed. The gear assembly includes a gear carrier having first and second sides. A first gear set is operably coupled to the first side, and adapted to receive rotational force from the motor shaft and provide rotational force at a second rotational speed that is less than the first rotational speed; and a second gear set is operably coupled to the second side and adapted to receive the rotational force from the first gear set and provide output rotational force at a third rotational speed that is greater than the second rotational speed.

In another embodiment, the present invention relates to a pneumatic sander. The pneumatic sander includes a tool housing, a motor disposed in the tool housing and having a motor shaft, wherein the motor shaft is adapted to rotate at a first rotational speed. A gear housing is coupled to the tool housing and includes internal gear teeth. A gear carrier is disposed in the gear housing, and has first and second sides. A first gear set is disposed in the gear housing and operably coupled to the first side, wherein the first gear set is adapted to engage the internal gear teeth and receive rotational force from the motor shaft and provide rotational force at a second rotational speed that is less than the first rotational speed. A second gear set is disposed in the gear housing and operably coupled to the second side, wherein the second gear set is adapted to engage the internal gear teeth and to receive the rotational force from the first gear set and provide output rotational force to an output shaft at a third rotational speed that is greater than the second rotational speed.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

DETAILED DESCRIPTION

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention relates broadly to pneumatic tool, such as a sander, that provides an optimum output speed (such as about 12,000 to 14,000 RPMs) and has significant stall torque to reduce the risk of the tool from stalling during use. The tool includes a coupled gear set that drives an output accessory, such as an abrasive pad, at an optimum speed without loss of power or power reduction, and with an amplified stall torque. The coupled gear set may include first and second gear sets. The first gear set may be used to reduce output speed, and also to drive the second gear set. The second gear set may be used to increase output speed. Thus, the first gear set functions as a speed reducer, and the second gear set functions as a speed increaser.

Figure 1:
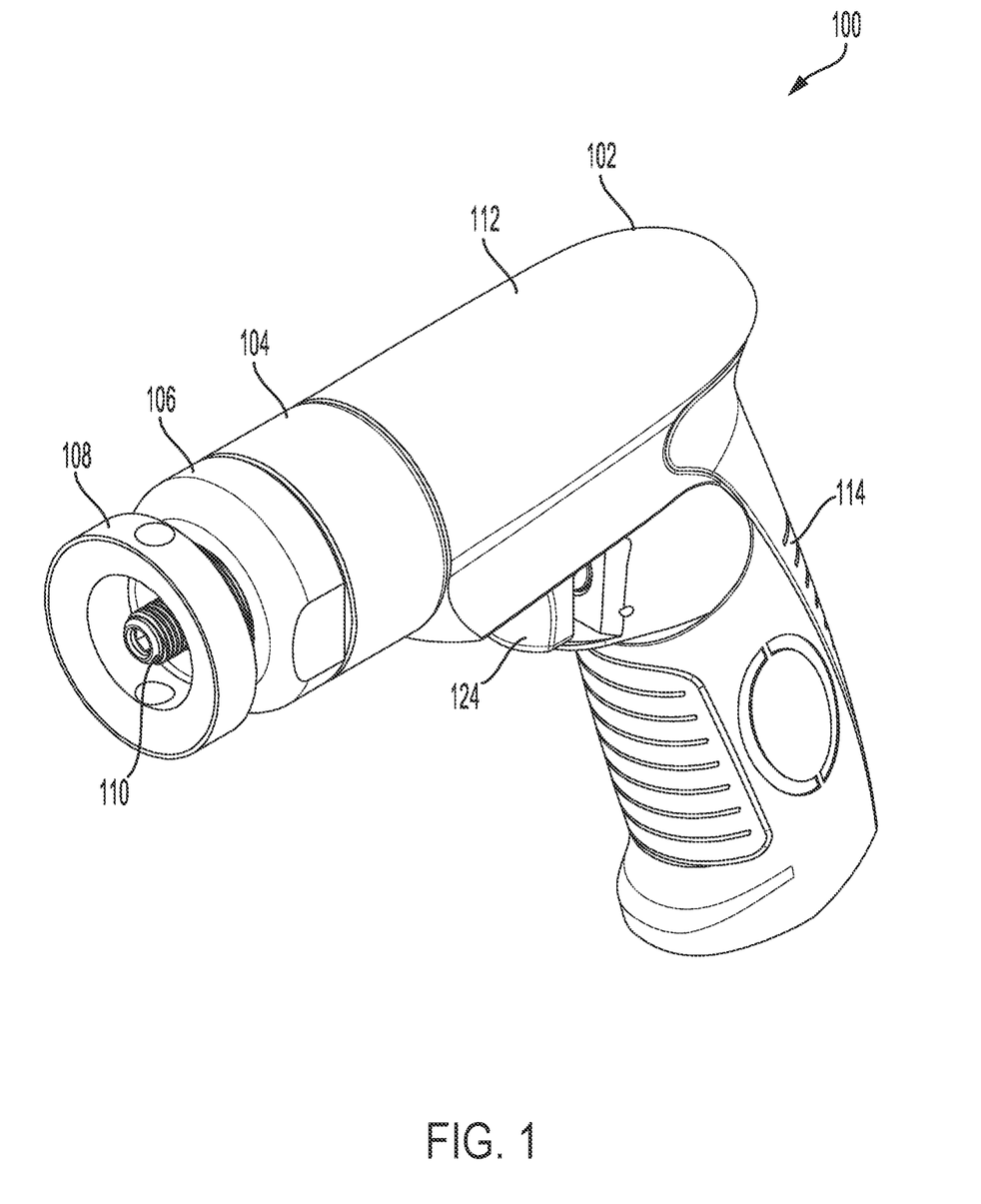
FIG. 1 is a perspective view of an exemplary tool, according to an embodiment of the present invention.
Figure 2:
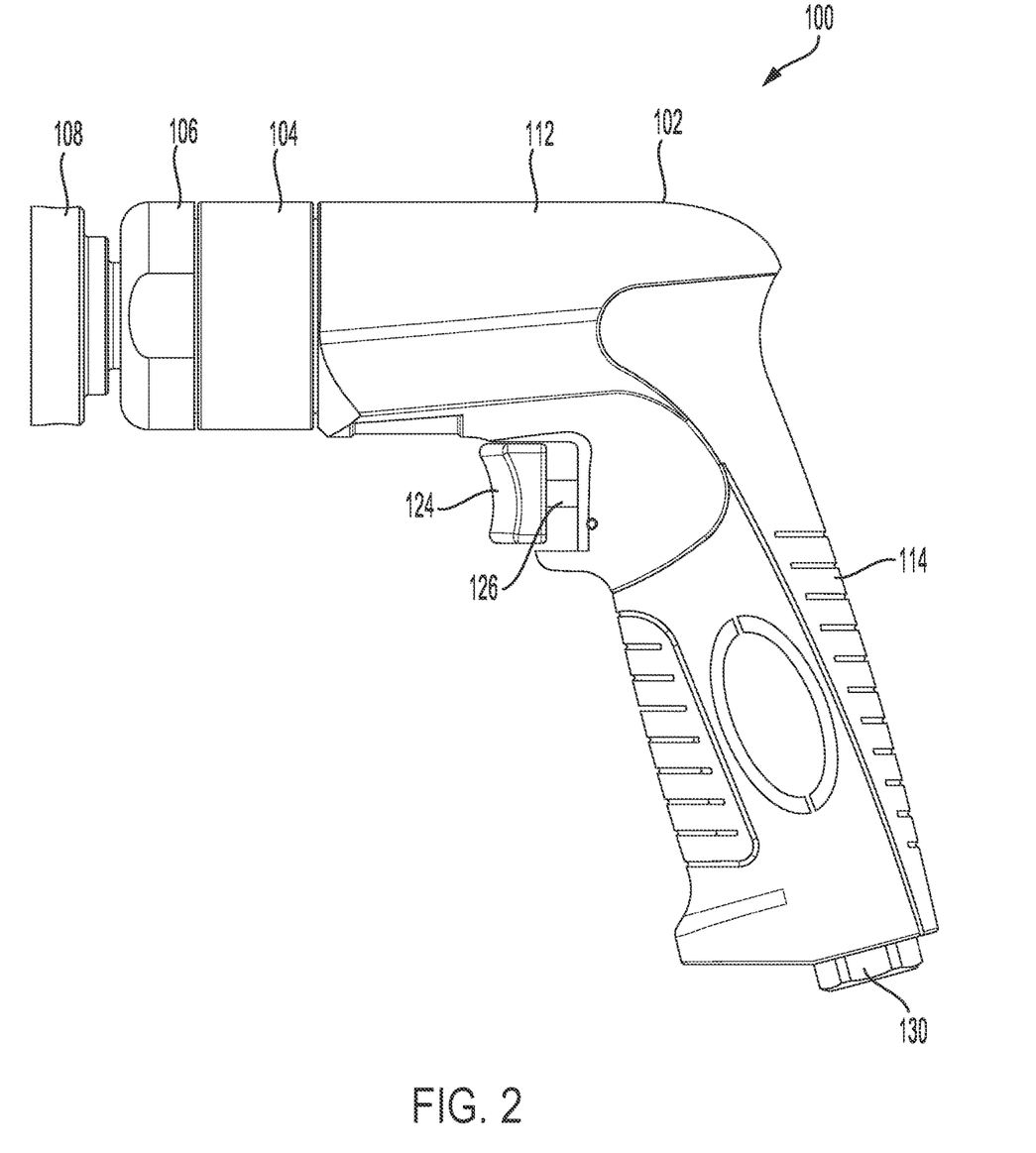
FIG. 2 is a side view of the tool of FIG. 1, according to an embodiment of the present invention.
Figure 3:
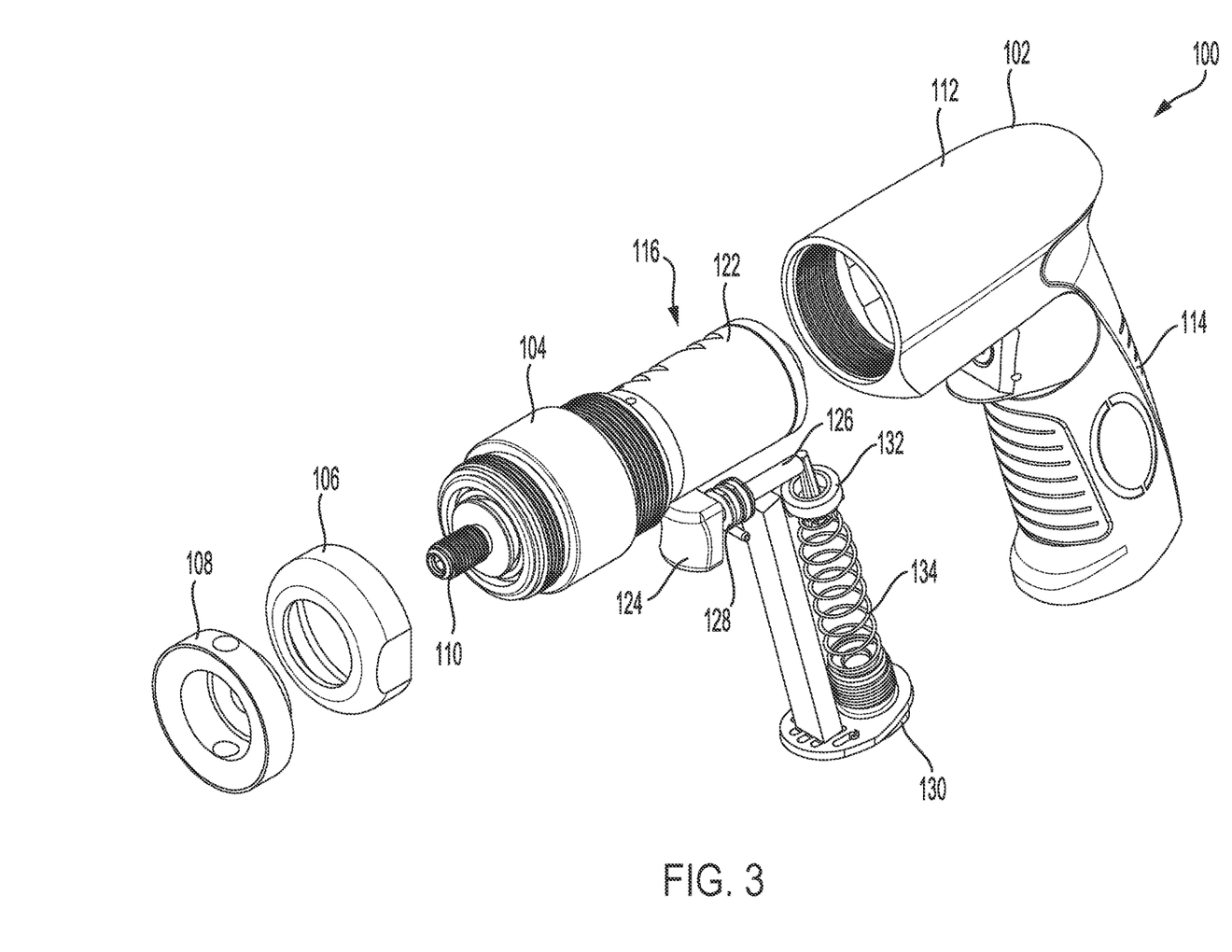
FIG. 3 is a partially exploded view of the tool of FIG. 1, according to an embodiment of the present invention.

Referring to FIGS. 1-3, an exemplary tool 100, such as a pneumatic sander, is illustrated. The tool 100 includes a tool housing 102, a gear housing 104 coupled to the tool housing 102, a nose cap or end cap 106 coupled to the gear housing 104, an output shaft 110 adapted to couple to an accessory, such as a backing pad and replaceable abrasive attachments (such as sanding pads or discs, etc.), or other type of accessory, and a hub 108 adapted to couple to the output shaft 110. The tool housing 102 includes a motor housing portion 112 and a handle housing portion 114. The motor housing portion 112 is adapted to house a motor 116. The handle housing portion 114 extends from the motor housing portion 112. The motor housing portion 112 and handle housing portion 114 may be disposed at an angle with respect to each other. For example, a longitudinal axis of the motor housing portion 112 and a longitudinal axis of the handle housing portion 114 may be disposed at an angle of about 90 to about 120 degrees, and more particularly about 110 degrees with respect to each other.

Figure 4:
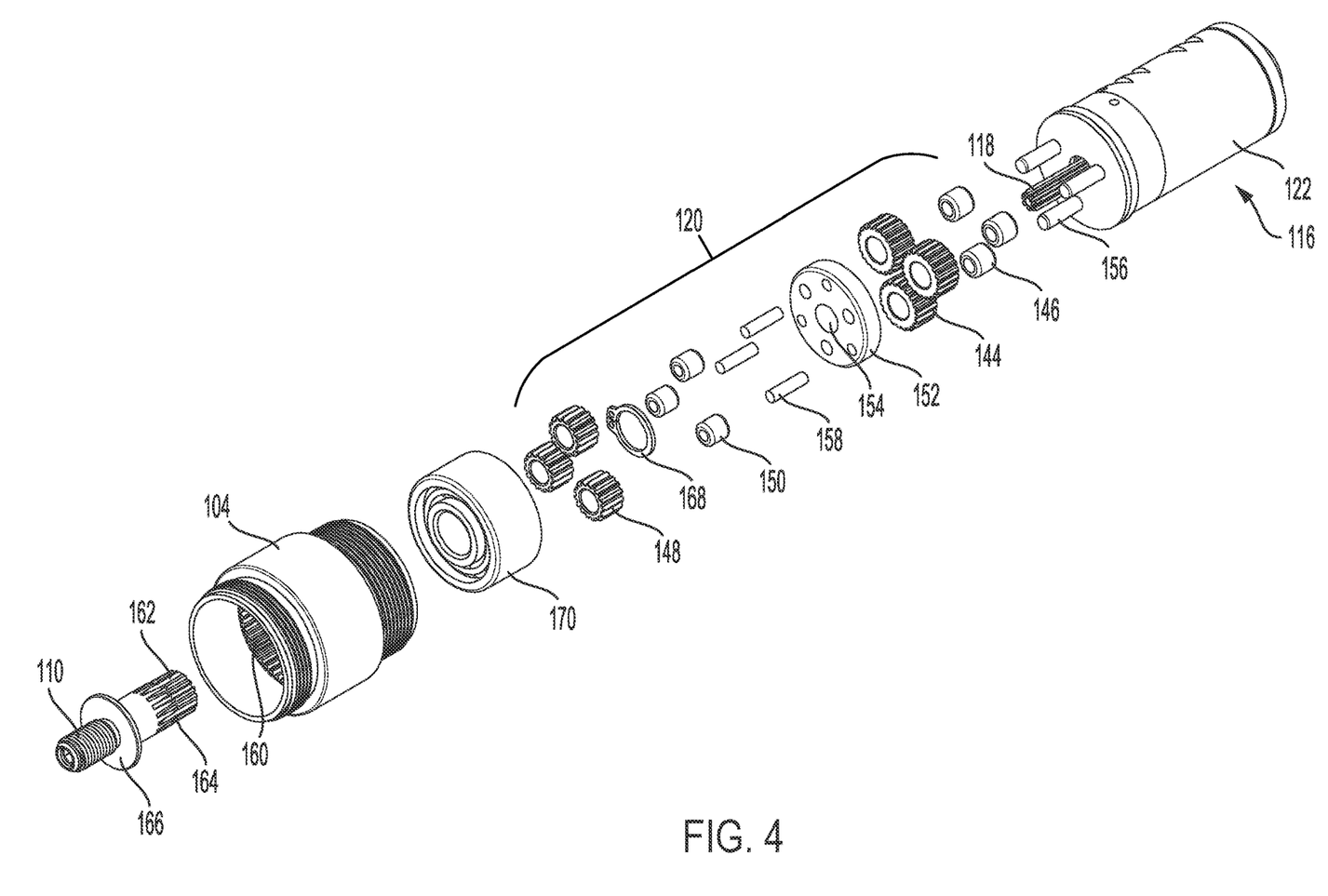
FIG. 4 is an exploded view of a gear assembly and motor of the tool of FIG. 1, according to an embodiment of the present invention.
Figure 5:
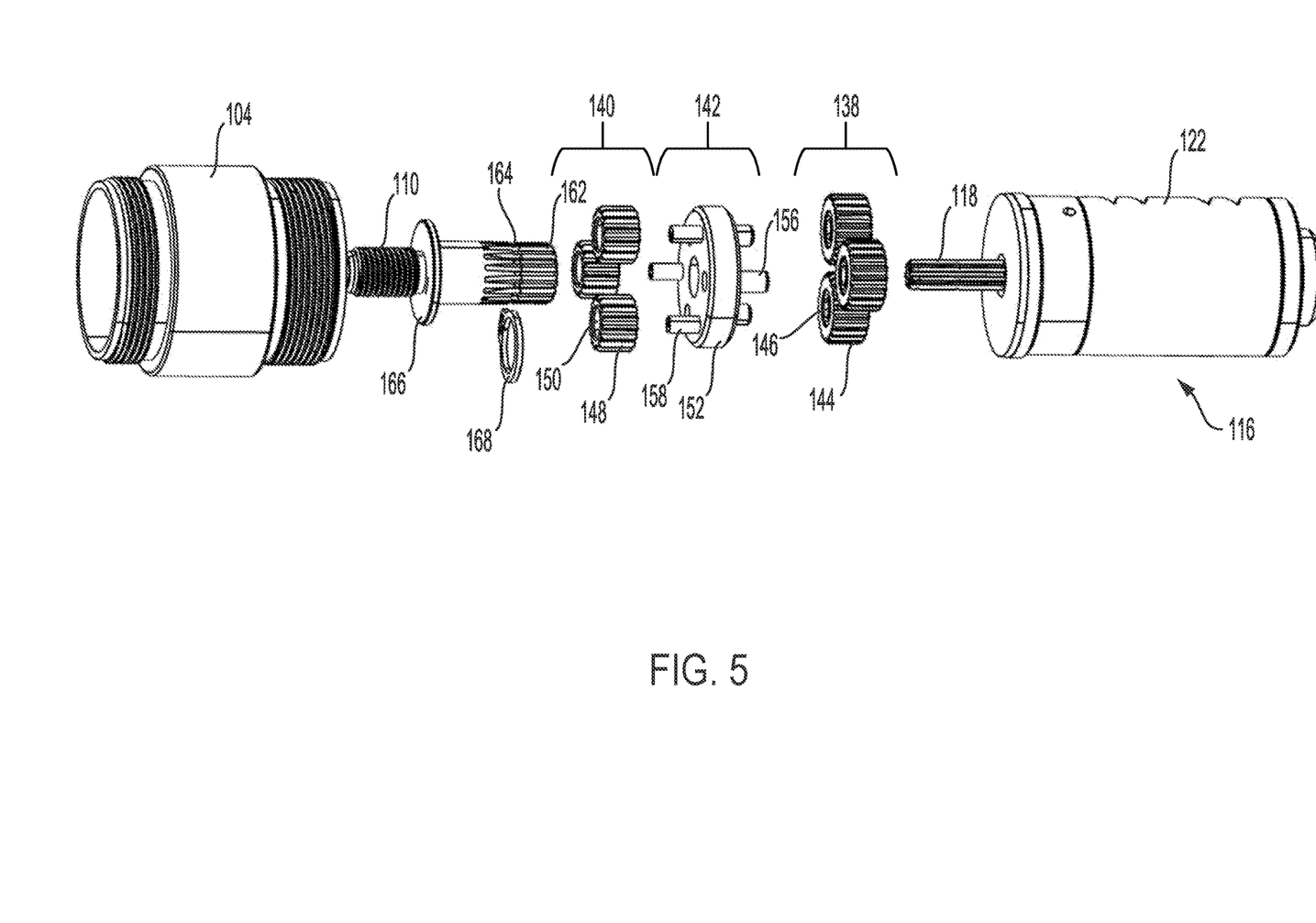
FIG. 5 is a partially exploded side view of the gear assembly and motor of the tool of FIG. 1, according to an embodiment of the present invention.

The motor 116 is disposed in the motor housing portion 112, and the output shaft 110 at a working end of the tool 100 is operably coupled to a motor shaft 118 of the motor 116 via a gear assembly 120 (as shown in FIG. 4, and discussed in further detail below). The motor 116 may include a motor casing 122 that houses a rotor with vanes or blades that extend radially outwardly from the rotor, and the motor shaft 118 may be coupled to the rotor. As known in the art, when air or fluid enters the motor casing 122, the air or fluid causes the vanes to rotate the rotor, and thereby rotate the motor shaft 118 to provide output rotational force.

The actuation of air or fluid into the motor casing 122 may be controlled by an actuatable trigger 124 that is disposed in and extends from the handle housing portion 114 proximal to the motor housing portion 112. The trigger 116 can be actuated by a user to cause fluid, such as, for example, pressurized air or hydraulic fluid, from an external supply to operate the tool 100 to drive the motor 116 (and motor shaft 118) in either one of first and second rotational directions (e.g., clockwise and counterclockwise). The trigger 124 can be biased such that the user can depress the trigger 124 inwardly, relative to the tool 100, to cause the tool 100 to operate, and release the trigger 124, wherein the biased nature of the trigger 124 causes the trigger 124 to move outwardly, relative to the tool 100, to cease operation of the tool 100.

Referring to FIG. 3, the trigger 124 may include a stem portion 126 extending from a rear of the trigger 124 and into the handle housing portion 114. A bushing 128 may be disposed on the stem portion 126 to provide a seal between the trigger 124/stem portion 126 and the handle housing portion 114. An inlet mechanism may also be disposed in the handle housing portion 114. The inlet mechanism may include an inlet bushing 130, and valve or regulator 132 with a bias member or spring 134. The inlet bushing 130 is adapted to removably couple to and receive air or fluid from an external supply. The spring 134 is adapted to bias the regulator 132 into a closed position that restricts or prevents air or fluid from entering the motor casing 122. When the trigger 124 is depressed inwardly relative to the tool 100, the stem portion 126 moves or biases the regulator 132 into an open position, thereby allowing air or fluid to enter the motor casing 122. When air or fluid enters the motor casing 122, the air or fluid causes the vanes to rotate the rotor, and thereby rotate the motor shaft 118 to provide output rotational force.

In an embodiment, the tool 100 may also include a direction selector mechanism with a valve that is actuatable via one or more buttons, to allow a user to select a either one of first or second rotational direction (e.g., clockwise and counterclockwise). For example, selection of the first rotational direction causes the valve to direct air or fluid into the motor casing 122 to rotate the rotor in a first direction, such as clockwise. Similarly, selection of the second rotational direction causes the valve to direct air or fluid into the motor casing 122 to rotate the rotor in a second direction opposite the first direction, such as counterclockwise.

Referring to FIGS. 4-8, the gear assembly 120 includes a first gear set 138 and a second gear set 140, and a gear carrier 142 adapted to receive the first and second gear sets 134, 140. The first gear set 138 includes first planet gears 144 with first gear teeth and first gear bearings 146 respectively disposed in the first planet gears 144. The second gear set 140 similarly includes second planet gears 148 with second gear teeth and second gear bearings 150 respectively disposed in the second planet gears 148.

Figure 6:
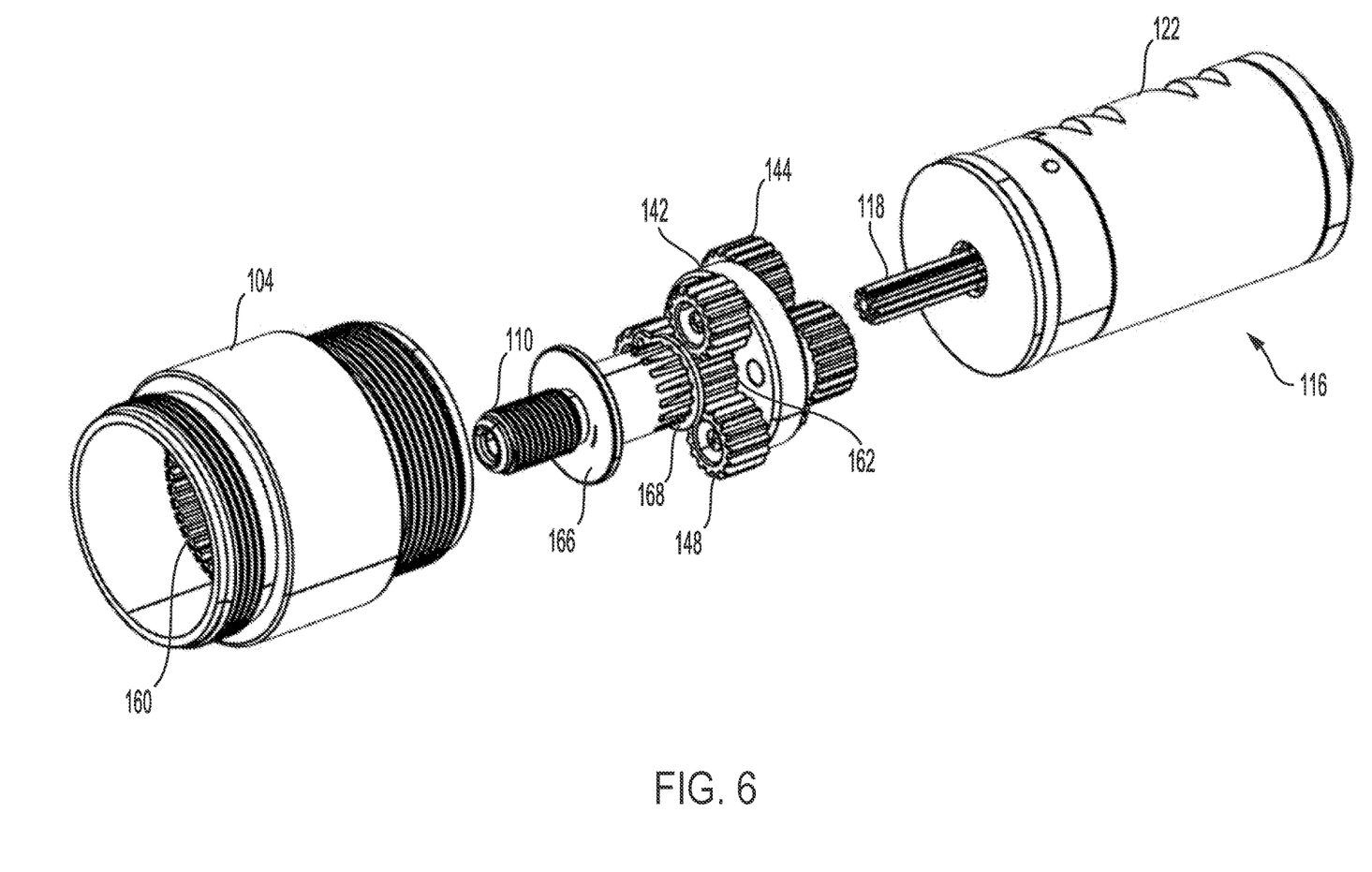
FIG. 6 is a partially exploded perspective view of the gear assembly and motor of the tool of FIG. 1, according to an embodiment of the present invention.
Figure 7:
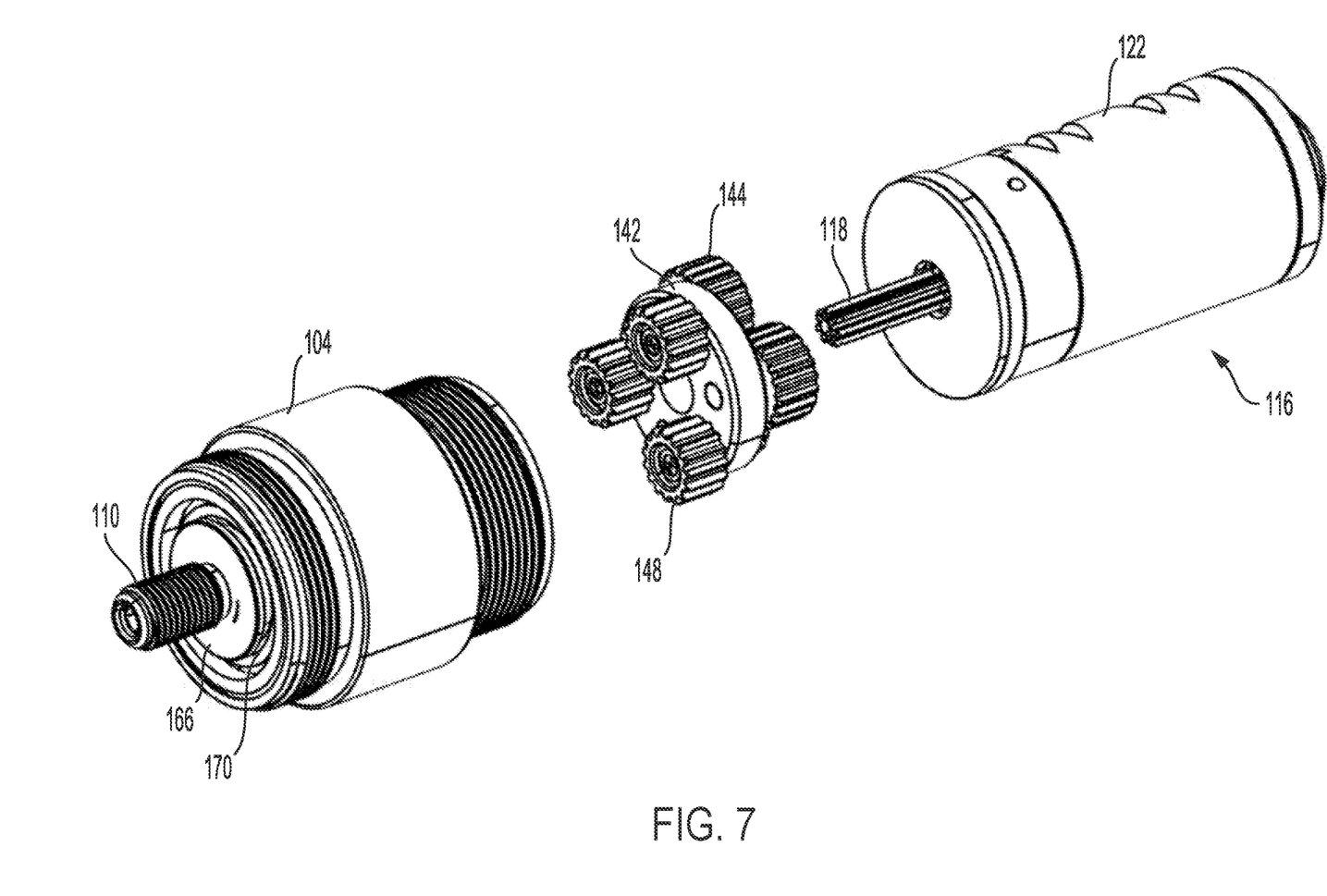
FIG. 7 is another partially exploded perspective view of the gear assembly and motor of the tool of FIG. 1, according to an embodiment of the present invention.
Figure 8:
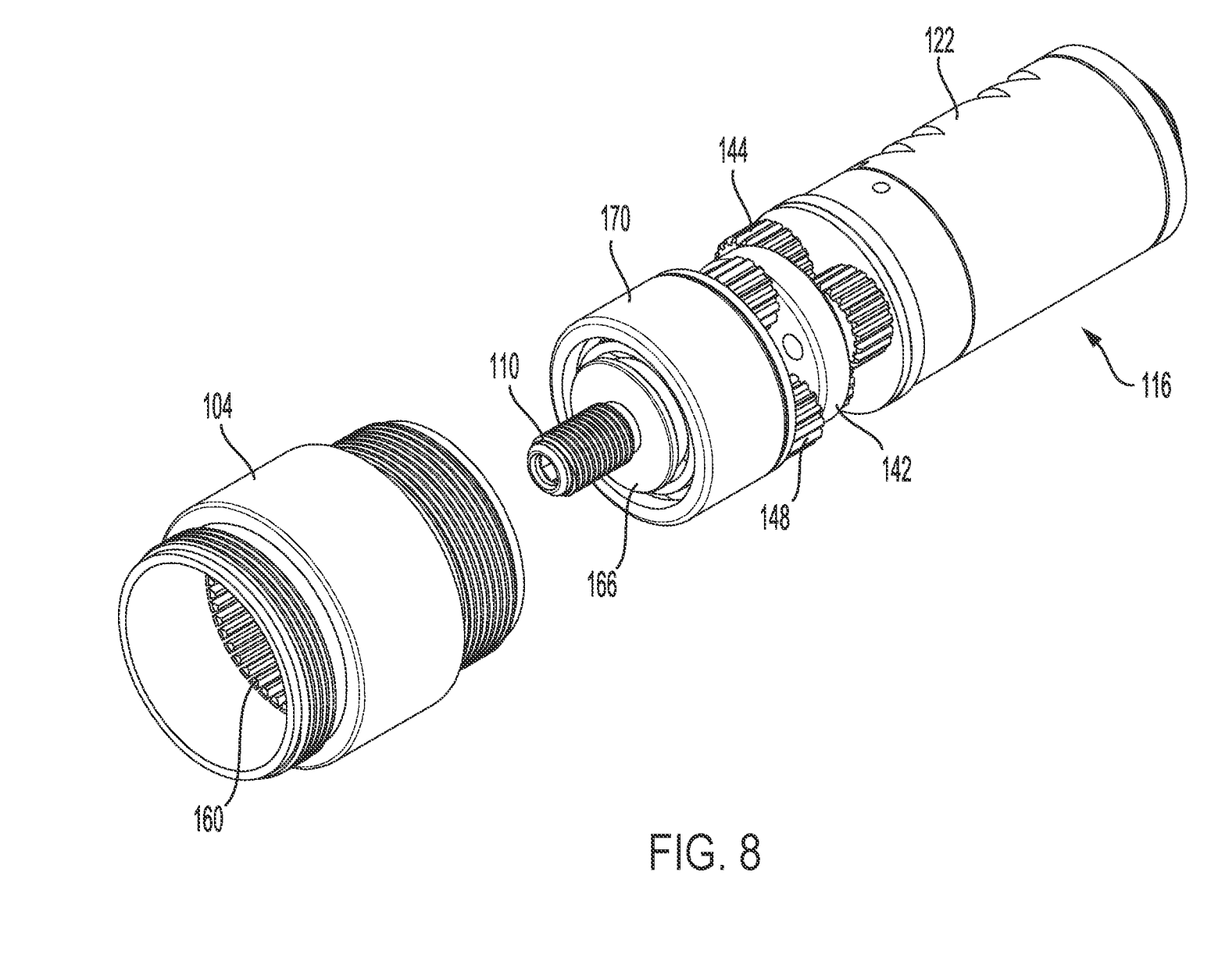
FIG. 8 is another partially exploded view of the gear assembly partially coupled to the motor of the tool of FIG. 1, according to an embodiment of the present invention.

The gear carrier 142 includes a base portion 152 having first and second opposing sides, and central aperture 154 adapted to receive and provide clearance for an end of the motor shaft 118 of the motor 116. First gear protrusions or carrier pins 156 are coupled to the first side of the base portion 152 and extend outwardly away from the base portion 152. The first carrier pins 156 are adapted to receive and engage respective ones of the first gear bearings 146 and first planet gears 144. Similarly, second gear protrusions or carrier pins 158 are coupled to the second side of the base portion 152 and extend outwardly away from the base portion 152. The second carrier pins 158 are adapted to receive and engage respective ones of the second gear bearings 150 and second planet gears 150. An example illustration of the first and second gear sets 138, 140 assembled onto the gear carrier 142 is shown in FIGS. 6 and 7. While three first planet gears 144 and three second planet gears 148 are shown in the exemplary embodiment, it will be appreciated that the number of first and second planet gears 144, 148 is not so limited and more or less than three may be implemented. Further, the first planet gears 144 may be larger in diameter than the second planet gears 148.

As shown in FIGS. 6 and 7, the gear housing 104 includes internal gear teeth 160, and functions as a ring gear in conjunction with the first and second planet gears 144, 148. For example, when assembled, the internal gear teeth 160 mate with and engage the first and second gear teeth of the first and second planet gears 144, 148.

When assembled, the motor shaft 118 is disposed between the first planet gears 144, and teeth of the motor shaft 118 mesh with and engage the first gear teeth of the first planet gears 144. The output shaft 110 also has a toothed end 162 that is similarly disposed between the second planet gears 148, and teeth of the toothed end 162 mate with and engage the second gear teeth of the second planet gears 148. The output shaft 110 may also include a groove 164 and a flange 166 that receives a locking or snap ring 168. A bearing 170 is disposed around the output shaft 110 between the flange 166 and ring 168 (or groove 164). The gear housing 104 is disposed around and radially covers the bearing 170, first and second gear sets 138, 140, and gear carrier 142.

During operation, the first gear set 138 functions to reduce rotational speed received from the motor shaft 118, and the second gear set 140 functions to increase rotational speed received from the first gear set 138. For example, when the trigger 116 is actuated or depressed by a user to cause fluid, such as, for example, pressurized air or hydraulic fluid, from an external supply to enter the motor casing 122, the air or fluid causes the vanes to rotate the rotor, and thereby rotate the motor shaft 118 to provide an output rotational force at a first rotational speed. The motor shaft 118 rotates the first planet gears 144 in a first stage of the gear assembly 120, and the first planet gears 144 are adapted to provide an output rotational force at a second rotational speed less than the first rotational speed. The first planet gears 144 are in engagement with the internal teeth 160 of the gear housing 104, which allows the first planet gears 144 to rotate the gear carrier 142 and provide rotational force to the second planet gears 148 in a second stage of the gear assembly 120. The second planet gears 148 are adapted to provide an output rotational force at a third rotational speed greater than the second rotational speed. The second planet gears 148 are also in engagement with the internal teeth 160 of the gear housing 104, and the second planet gears 148 rotate with the gear carrier 142 and provide rotational force to the toothed end 162 of the output shaft 110 to provide output rotational speed and torque.

The gear assembly 120 thus provides first and second stages, where the first stage functions to reduce rotational speed, and the second stage functions to increase rotational speed. This provides a pneumatic sander tool 100 that has an optimum output rational speed (such as about 12,000 to 14,000 RPMs) and has significant stall torque to reduce the risk of the tool 100 from stalling during use.

As discussed herein, the tool 100 can be a pneumatic tool, such as, for example, a sander. However, the tool 100 can be any pneumatically or hydraulically powered or hand-held tool, such as a polisher, ratchet wrench, torque wrench, impact wrench, drill, saw, hammer, or any other tool.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool with a tool housing and a motor having a motor shaft and being disposed in the tool housing, wherein the motor shaft rotates at a first rotational speed, the tool comprising:
   a gear carrier having first and second sides;
   a first gear set operably coupled to the first side, and adapted to receive rotational force from the motor shaft and provide rotational force at a second rotational speed that is less than the first rotational speed;
   a second gear set operably coupled to the second side and adapted to receive the rotational force from the first gear set and provide output rotational force at a third rotational speed that is greater than the second rotational speed;
   an output shaft operably coupled to the second gear set to receive the output rotational force, wherein the output shaft includes a flange extending radially outwardly and a groove spaced from the flange; and
   a bearing disposed on the output shaft between the flange and the groove.

2. The tool of claim 1, wherein the first gear set includes at least three first planet gears.

3. The tool of claim 2, wherein the second gear set includes at least three second planet gears.

4. The tool of claim 2, wherein the first gear set is adapted to receive and engage the motor shaft.

5. The tool of claim 3, wherein the second gear set is adapted to receive and engage a toothed portion of the output shaft.

6. The tool of claim 3, wherein the first planet gears are larger than the second planet gears.

7. The tool of claim 1, further comprising a gear housing radially covering the first and second gear sets.

8. The tool of claim 7, wherein the gear housing includes internal gear teeth adapted to engage first gear teeth of the first gear set and second gear teeth of the second gear set.

9. The tool of claim 1, further comprising an actuatable trigger adapted to cause air or fluid to enter the motor upon actuation of the trigger.

10. A gear and output assembly for a tool with a tool housing and a motor disposed in the tool housing and having a motor shaft adapted to rotate at a first rotational speed, the gear and output assembly comprising:
    a gear housing having opposing first and second ends and internal gear teeth, wherein the first end is adapted to be coupled to the tool housing and the second end is adapted to be coupled to a nose housing of the tool;
    a gear carrier disposed in the gear housing and having first and second sides;
    a first gear set operably coupled to the first side and including first gear teeth adapted to engage the internal gear teeth, and the first gear set is adapted to receive rotational force from the motor shaft and provide rotational force at a second rotational speed that is less than the first rotational speed;
    a second gear set operably coupled to the second side and including second gear teeth adapted to engage the internal gear teeth, and the second gear set is adapted to receive the rotational force from the first gear set and provide output rotational force at a third rotational speed that is greater than the second rotational speed;
    an output shaft operably coupled to the second gear set to receive the output rotational force, wherein the output shaft includes a flange extending radially outwardly and a groove spaced from the flange; and a bearing disposed on the output shaft between the flange and the groove.

11. The gear and output assembly of claim 10, wherein the first gear set includes at least three first planet gears.

12. The gear and output assembly of claim 11, wherein the second gear set includes at least three second planet gears.

13. The gear and output assembly of claim 12, wherein the first planet gears are larger than the second planet gears.

14. The gear and output assembly of claim 10, wherein the gear housing radially covers the first and second gear sets.

15. A pneumatic sander, comprising:

a tool housing;

a motor disposed in the tool housing and having a motor shaft, wherein the motor shaft is adapted to rotate at a first rotational speed;

a gear housing having opposing first and second ends and including internal gear teeth, wherein the first end is coupled to the tool housing;

a nose housing coupled to the second end of the gear housing;

a gear carrier disposed in the gear housing, and having first and second sides;

a first gear set disposed in the gear housing and operably coupled to the first side, wherein the first gear set is adapted to engage the internal gear teeth and to receive rotational force from the motor shaft and provide rotational force at a second rotational speed that is less than the first rotational speed;

a second gear set disposed in the gear housing and operably coupled to the second side, wherein the second gear set is adapted to engage the internal gear teeth and to receive the rotational force from the first gear set and provide output rotational force at a third rotational speed that is greater than the second rotational speed;

an output shaft extending from the nose housing and operably coupled to the second gear set to receive the output rotational force, wherein the output shaft includes a flange extending radially outwardly and a groove spaced from the flange; and a bearing disposed on the output shaft between the flange and the groove.

16. The pneumatic sander of claim 15, wherein the first gear set includes at least three first planet gears.

17. The pneumatic sander of claim 16, wherein the second gear set includes at least three second planet gears.

18. The pneumatic sander of claim 17, wherein the first planet gears are larger than the second planet gears.

19. The pneumatic sander of claim 15, further comprising an actuatable trigger adapted to cause air or fluid to enter the motor and rotate the motor shaft upon actuation of the trigger.

20. The pneumatic sander of claim 15, further comprising first carrier pins that extend outwardly away from the first side, wherein first gears of the first gear set are respectively disposed on the first carrier pins.

21. The pneumatic sander of claim 15, further comprising second carrier pins that extend outwardly away from the second side, wherein second gears of the second gear set are respectively disposed on the second carrier pins.

* * * * *